US008679232B2

(12) United States Patent
Wolf et al.

(10) Patent No.: US 8,679,232 B2
(45) Date of Patent: Mar. 25, 2014

(54) ROTATING PACKED BED

(71) Applicant: ALSTOM Technology Ltd, Baden (CH)

(72) Inventors: Hartwig Wolf, Ennetbaden (CH); Petar Aleksic, Baden (CH); Frank Klaus Ennenbach, Dreieich (DE); Mark Harvey Tothill, Cranfield (GB)

(73) Assignee: ALSTOM Technology Ltd (CH)

( * ) Notice: Subject to any disclaimer, the term of this patent is extended or adjusted under 35 U.S.C. 154(b) by 0 days.

(21) Appl. No.: 13/961,337

(22) Filed: Aug. 7, 2013

(65) Prior Publication Data

US 2013/0319235 A1 Dec. 5, 2013

Related U.S. Application Data

(63) Continuation of application No. PCT/EP2012/052016, filed on Feb. 7, 2012.

(30) Foreign Application Priority Data

Feb. 9, 2011 (EP) ..................................... 11153864

(51) Int. Cl.
  *B01D 47/14* (2006.01)
(52) U.S. Cl.
  USPC ................... 95/199; 95/211; 95/214; 95/223; 261/83; 96/281; 96/290
(58) Field of Classification Search
  USPC .......................................................... 95/211
  See application file for complete search history.

(56) References Cited

U.S. PATENT DOCUMENTS

| 4,198,361 | A | 4/1980 | Shafranovsky et al. |
| 4,400,275 | A | 8/1983 | Ramshaw et al. |
| 6,884,401 | B2 | 4/2005 | Yang et al. |
| 2003/0219370 | A1 | 11/2003 | Guo et al. |
| 2011/0303088 | A1* | 12/2011 | Dutra E Mello et al. ....... 95/151 |

FOREIGN PATENT DOCUMENTS

| EP | 0 023 745 | 2/1981 |
| EP | 0 204 193 | 12/1986 |
| EP | 2 018 900 | 1/2009 |

OTHER PUBLICATIONS

Rao, et al., "*Process Intensification in Rotating Packed Beds (HIGEE): An Appraisal*", Ind. Eng. Chem. Res. 2004, 43, 1150-1162.

* cited by examiner

*Primary Examiner* — Duane Smith
*Assistant Examiner* — Joubert X Glover

(57) ABSTRACT

A rotating packed bed RPB that includes a first and second packed bed both arranged on the same rotatable shaft. A gas is directed via a gas inlet through the first packed bed in co-current flow with a liquid in a radially outward direction towards the outer radius of the packed bed. The liquid enters the first packed bed via a first liquid inlet. The gas exiting the first packed bed is directed to the second packed bed and forced through it in a radially inward direction in counter-current flow with a liquid, which enters through a second liquid inlet. The arrangement allows an operation of the rotating packed bed with less energy compared to RPBs of the prior art operating in counter-current flow only. The apparatus allows low-cost design and high design flexibility.

16 Claims, 2 Drawing Sheets

ROTATING PACKED BED

CROSS-REFERENCE TO RELATED APPLICATIONS

This application claims priority to PCT/EP2012/052016 filed Feb. 7, 2012, which in turn claims priority to European Application 11153864.1 filed Feb. 9, 2011, the contents of which are both hereby incorporated in their entirety.

TECHNICAL FIELD

The present invention pertains to a rotating packed bed for an absorption or desorption process and an absorption or desorption method using a rotating packed bed.

BACKGROUND

Packed beds are known in the art for their applications in gas-liquid separations such as air from water or absorption/desorption processes such as the absorption of a particular gas from an exhaust gas. The performance of packed beds, also referred to as packed columns, is primarily given by the porosity of the material used for the packing, its total surface area of the packed bed, as well as the total height of the column. Typically, a gas and a liquid are directed through stationary packed beds in counter-current flow direction to one another, because a higher separation efficiency can be achieved in a counter-current-flow process compared to co-current-flow process.

In stationary packed beds the liquid passing through the packing is only acted on by gravity, which results in the fact that the columns must be designed with a considerable height in order to achieve a desired degree of separation.

Rotating packed beds, as for example first presented by its initial inventor in U.S. Pat. No. 4,400,275 consists of a packing arranged on a shaft, through which gas and liquid are passed. The rotation of the packed bed on the shaft allows to increase the specific surface area per volume acting in the separation process such that the total volume of the packed bed for a given performance may be smaller compared to that of a stationary packed column. While the mass transfer coefficient for a rotating bed is beneficially increased, the pressure loss suffered across the bed however is increased.

In a stationary packed column, gravity acts on the liquid flow through the packing and buoyancy of the gas allows it to flow through the packing in upward direction. A rotating packed bed on the other hand requires additional energy for acceleration of the gas through the packed bed while overcoming the frictional forces as well as to operate the rotating system.

In D. P. Rao, A Bhowal, P. S. Goswami, "Process Intensification in Rotating Packed Beds: An Appraisal", Ind. Eng. Chem. Res 2004, 43, 1150-1162, a rotating packed bed is presented, where gas introduced into the casing of the rotating bed enters at the peripheral tip of the rotating shaft and flows radially inward to the rotor's eye, where it leaves the apparatus through an outlet pipe. The liquid is fed in the form of a droplet spray or jet into the packed bed at the eye of the rotor, passes over the packing under the influence of the centrifugal force in a radially outward direction, and leaves the apparatus via an outlet pipe at the periphery of the rotating packed bed. Parameters, which determine the efficiency of a separation process due to the rotation, such as throughputs, gas flow, liquid flow, pressure drop, flooding, mass transfer coefficient on the gas- and liquid-side, and power requirements, are discussed.

U.S. Pat. No. 6,884,401 discloses a rotating packed bed with an inlet for a high viscosity liquid at a point near the axis of the rotating shaft and an outlet for the liquid at the periphery of the bed. An inlet is provided for a gas to pass radially inward through the rotating packing.

EP 2018900 discloses the use of a rotating bed for the degassing of a liquid, where a vacuum is applied to the interior region of the rotating packed bed via a gas outlet at the axis of the rotating bed's shaft. The degassed liquid is passed over the packing in a radially outward direction and can exit the device through an outlet near its periphery.

SUMMARY

It is an object of the present invention to provide a rotating packed bed for the absorption of a gas in a liquid or the desorption from a liquid that requires a reduced amount of energy to operate compared to rotating packed beds known in the art.

It is furthermore an object of the invention to provide a method of absorption of a gas in a liquid or desorption from a liquid using a rotating packed bed, which is improved over the prior art in terms of the energy required to perform the method.

According to the present invention, a rotating packed bed RPB comprises a first and second packed bed arranged adjacent to one another on a rotatable shaft and an inlet for a gas and an inlet for a liquid both arranged at the rotating shaft and configured to allow the gas and liquid to flow through the first packed bed in co-current flow and in a radially outward direction.

The RPB further comprises a second inlet for a second liquid arranged at the rotating shaft and configured to allow this liquid to pass through the second packed bed in a radially outward direction and in counter-current flow with the gas. The gas flows from a first gas plenum extending along the shaft between the shaft and the inner radius of the first bed, to a second gas plenum at the outer radius of the first bed extending along the outer radius of both the first and second bed such that the gas can flow from the first to the second bed. The gas flows from this second gas plenum through the second bed into a third gas plenum at the inner radius of the second bed along the shaft and then exits the apparatus through an outlet.

In a method according to the invention for the absorption of a liquid in a gas or the desorption of a liquid from a gas, a gas is first directed co-currently with a liquid in a radially outward direction through a first rotating packed bed and the same gas is directed through a gas plenum to a second packed bed, from where it is directed in counter-current flow to a liquid in a radially inward direction through a second rotating packed bed.

The RPB according to the invention combines counter-current and co-current flow in one rotating packed bed apparatus. The invention utilizes the advantages of both co-current and counter-current flow processes and thereby allows an optimization of the process efficiency of the RPB.

The gas flowing co-currently with the liquid through the first packed bed in the radially outward direction effects is accelerated together with the liquid under the influence of centrifugal force. The subsequent pressure build-up is utilized to force the gas through the second packed bed overcoming the centrifugal force. The energy to accelerate the gas through the packed bed in co-current direction with the liquid is recovered when it is forced through the second packed bed. Effectively, the operation of the rotating packed bed according to the invention requires less energy compared to RPBs of the prior art operated only with counter-current flow of the gas and liquid.

The arrangement of two packed beds on one rotating shaft with a serial direction of the gas flow through both beds, allows the gas-liquid interaction, be it either an absorption or a desorption process, to take place on a larger scale, i.e. along a longer effective flow path. The actual dimension of the apparatus however, specifically the diameter of the RPB, can remain small. This feature allows greater flexibility in the design of the RPB. For example, the number or rotating packed beds arrange in series on a single shaft may be increased while keeping their diameters small. This enables a fabrication at both reduced effort and lower cost. Moreover, the reduction dimension of the apparatus allows an extended range of operation and application of the RPB.

The combination of two packed beds arranged for co-current flow combined with counter-current flow allows for several further possibilities of optimizing the apparatus and process efficiency. The combination of two beds allows the combination of different packing types, different relative packing sizes including radial heights, cross-sectional areas, and radial position of the individual packed beds.

Furthermore, the apparatus allows for different liquid-to-gas mass flows through two packed beds. Finally, the apparatus allows for either the same of different liquids to be used for the two beds.

The number of parameters to influence the overall mass transfer coefficient of the RPB as a whole is significantly increased compared to that of an RPB of the prior art. All the parameters are available for further optimization of process efficiency, cost, size, and manufacturability and thereby significantly increase the design flexibility available for the apparatus.

Typically, the thermal separation efficiency for a co-current packed bed is lower compared to a counter-current. However, in case of a short/optimized co-current section the local efficiency can clearly exceed the counter-current flow arrangement due to higher concentration gradients. Followed by a counter-current RPB the overall efficiency is even increased by this arrangement.

In an exemplary embodiment of the apparatus, the first and second liquid inlets are configured for the same liquid to be directed through both packed beds. This means that the liquid directed through the first packed bed is recirculated and directed through the second bed as well. For this, the apparatus comprises means to direct the liquid exiting from the first packed bed from the outer radius of that packed bed to the second packed bed and at the rotating shaft.

In a particular embodiment, the inlet for the liquid through the second packed bed is configured to direct a liquid of same type as was used for the first packed bed, where this liquid is however a fresh liquid and not recirculated from the first bed. Thereby, the separation process may be optimized because the liquid has a greater separation or absorption efficiency. The direction of a fresh liquid through the second packed bed can offset the reduced separation efficiency achieved in the first packed bed due to the co-current flow of the liquid and gas.

In this case however, the first and second liquid inlets for first and second packed beds can be both connected to the same source of liquid.

In a further exemplary embodiment, the first and second liquid inlets are configured and arranged for two different liquids to flow through the two beds. These two liquids can differ either in their type or temperature.

For example, the two liquid inlets can be connected each to different sources each containing a liquid of different composition.

In a variant, the liquid inlets are connected to liquid sources of different temperature. This allows a further possibility of fine tuning the process efficiency.

In an exemplary embodiment, the liquid inlets for both the first and second packed beds are configured with means of liquid distributors such as spray nozzles or jets.

The RPB according to the invention is applicable to separation processes including absorption processes such as for example $CO_2$ absorption from a flue gas resulting from a combustion process, desorption gas stripping, deaereation processes such as deaeration of make-up water for a water-steam cycle of a power plant, or desulphurization.

In a particular embodiment of the invention, the RPB can be extended to any number of packed beds arranged on the same shaft in addition to the first and second beds described, where the gas is directed in series through each of the packed beds, consistently alternating from a co-current flow to a counter-flow and again to a co-current flow with the liquid. Such arrangement allows a yet higher degree of separation or absorption and the use of a larger variety of different packed bed parameters in combination and a greater degree of process optimization.

DETAILED DESCRIPTION

Figure 1:
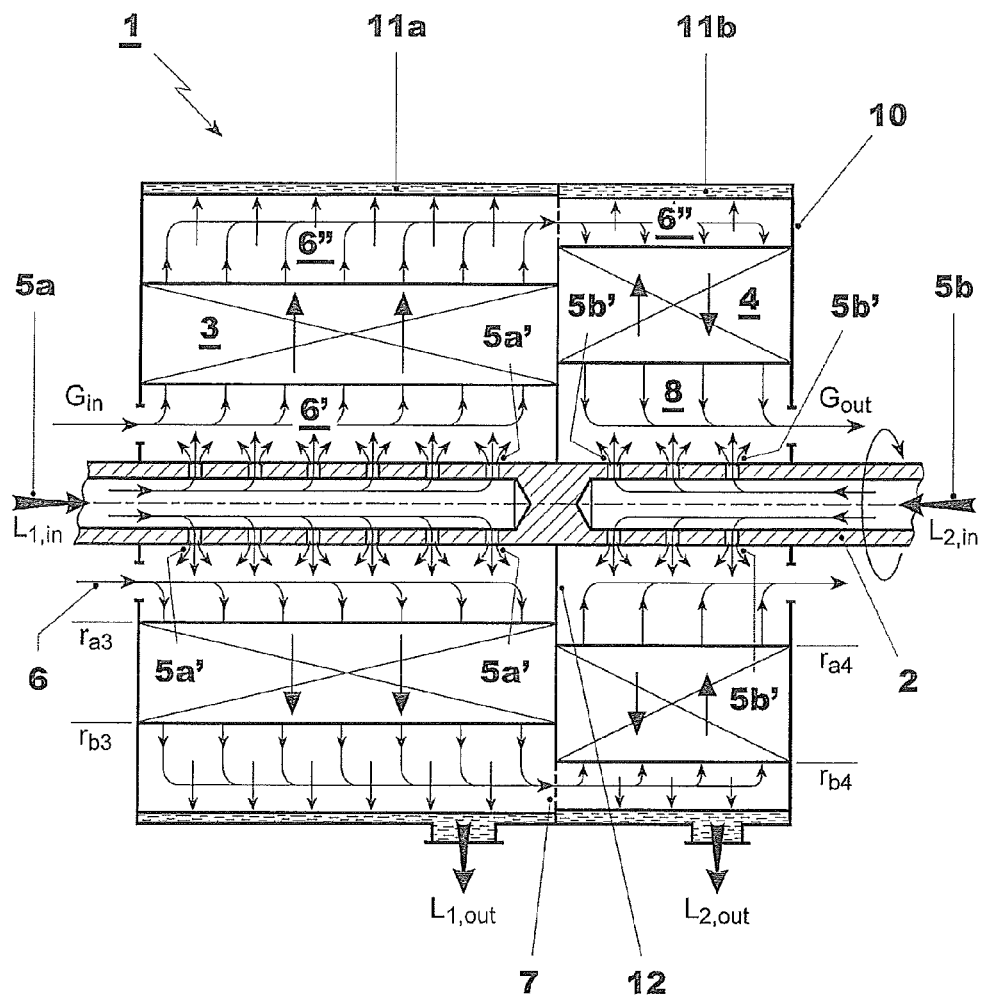
FIG. 1 shows a cross-sectional view of a rotating packed bed according to the invention having two packed beds arranged in series.

FIG. 1 shows a cross-section of a rotating packed bed 1 having a casing 10 and arranged on a horizontally aligned shaft 2 driven by a motor. The shaft is arranged horizontally in this example. An arrangement with a vertical shaft is also possible.

A first packed bed 3 and a second packed bed 4 are arranged adjacent to one another on the shaft, where both packed beds have an inner radius ra3 and ra4 respectively and an outer radius rb3 and rb4 respectively. Both inner radii ra3 and ra4 are adjacent to the shaft. A line 6 for a gas, for example for the exhaust flue gas of a gas turbine, is arranged to direct the gas through a first inlet Gin through the casing 10 of the apparatus. The gas enters a first plenum 6' extending along the shaft between the shaft and the inner radius ra3 of the first bed 3. Arrows indicate the flow of gas through the plenum and into the first packed bed.

A line 5a for a liquid, e.g. water to be deareated or $CO_2$ absorbing MEA solution (monoethanolamine), is arranged within the shaft 2 itself and comprises a plurality of distributor means 5a' distributing the liquid over the surface of the packed bed 3. The liquid flows in the manner of a thin film over the surfaces of the packing and interacts there with the gas flowing in co-current flow through the packing. As indicated by the two parallel arrows pointing in same direction, both the gas and liquid are accelerated by means of the centrifugal force.

The gas reaching through the first packed bed 3 at the outer radius of the apparatus 1 exits the packing 3 into a second cylindrically-shaped gas plenum 6", which extends along the outer radius rb3 and rb4 of both the first and second packing 3 and 4 and flows past a membrane, for example a moisture separation element 7, into a the gas plenum 6" between the outer casing of the apparatus and the outer radius of the second bed 4.A The gas is directed from this plenum 6" in a radially inward direction through the second packed bed 4 back toward the shaft 2.

The liquid having passed through the first packing 3 is collected at the outer periphery in a plenum 11a having an outlet L1, out, through which the liquid is directed to further use or treatment.

A second liquid line 5b is arranged in the rotating shaft at the level of the second packed bed 4, where this liquid line can carry either the liquid having exited through the outlet L1, out or another liquid of same or different type and/or temperature and comprises a plurality distributor means 5b' that distribute the liquid over the radially inner surface of the second packed bed 4. The liquid passes through the packing in the radially outward direction and in counter-current flow to the gas through the second packing as indicated by the two parallel but opposing arrows. The gas is forced through this packing by means of the pressure it has built up within the first packing.

The exemplary apparatus in FIG. 1 shows a first and second packing having different values for both the inner and outer radii of the two packed beds. All these values can be varied in view of optimal apparatus efficiency.

Due to the counter-current flow in the second rotating packed bed 4 the process of absorption or desorption is characterized by a concentration gradient, which varies less compared to that in the first rotating packed bed.

The treated/cleaned gas in case of absorption and the desorbed gas in case of desorption enters a final gas plenum 8 extending from the inner radius ra4 of the second packed bed 4 to the shaft, from where the gas is directed out of the apparatus via a gas outlet Gout into a gas line that directs the gas to further use or processing.

The liquid having passed through the second packed bed 4 is collected in a plenum 11b, from where the liquid exits the apparatus via an outlet L2, out.

Figure 2:
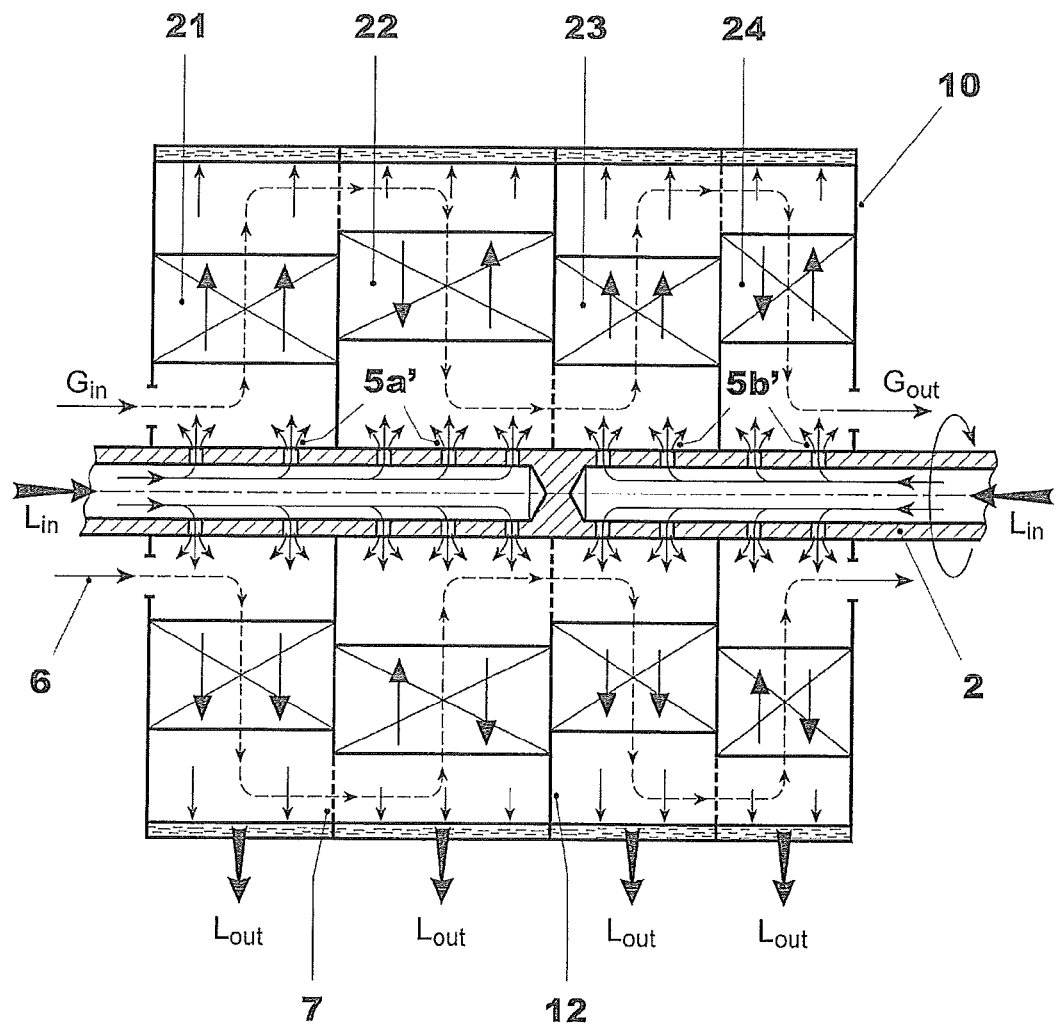
FIG. 2 shows a rotating packed bed according to the invention extended to more than two packed beds.

FIG. 2 shows an embodiment of the invention in the form of an extension of the concept to more than two packed beds in the RPB. The apparatus shows exemplary four packed beds 21-24 arranged on a rotating shaft 2 within a casing 10. The gas to be processed is directed into the apparatus through the gas inlet Gin and passes through the first packing 21 in co-current flow with the liquid, followed by a counter-current flow with a liquid through the second packing 22, again a co-current flow through the third packing 23 and a counter-current flow in the last packing 24 as indicated by the arrows within each packing. The liquid or liquids can be directed through a one or more inlets Lin. The example illustrates the numerous design possibilities given by the concept according to the invention, both in number of the packings, types, sizings, and radial positions of the individual packings.

What is claimed is:

1. A rotating packed bed (RPB) arranged on a rotatable shaft, the RPB comprising:
    a first packed bed and second packed bed arranged adjacent to one another alongside the shaft, the first packed bed having an inner radius and an outer radius and the second packed bed having an inner radius and an outer radius,
    the RPB further comprising a gas inlet arranged at the rotating shaft or at the outer periphery of the first packed bed, respectively, and a first gas plenum extending from the shaft to the inner radius or from the casing to the outer radius, respectively, of the first packed bed, and a first liquid inlet arranged at the rotating shaft and liquid distribution means,
    the RPB further comprising a second gas plenum extending along the outer radius or long the inner radius, respectively, of the first packed bed and the outer radius or the inner radius, respectively, of the second packed bed and a third gas plenum extending from the inner radius or from the outer radius, respectively, of the second bed to the shaft and a second liquid inlet arranged at the rotating shaft and liquid distributor means, and wherein
    the liquid distributor means are arranged and configured to allow the liquid to flow through the first packed bed in co-current flow with the gas in a radially outward direction or arranged and configured to allow the liquid to flow through the first packed bed in a radially inward direction in counter-current flow with the gas, respectively, the liquid distributor means being also arranged and configured to allow the second liquid to pass through the second packed bed, in a radially outward direction in counter-current flow with the gas or arranged and configured to allow the second liquid to pass through the second packed bed in a radially outward direction in co-counter flow with the gas, respectively.

2. The rotating packed bed according to claim 1 wherein the first liquid inlet and the second liquid inlet are both connected to a common source.

3. The rotating packed bed according to claim 1 wherein the first liquid inlet and the second liquid inlet are connected to different liquid sources.

4. The rotating packed bed according to claim 1 wherein the RPB comprises means to recirculate the liquid emerging from the first packed bed at the outer radius of the RPB to the second liquid inlet at rotating shaft and the second packed bed.

5. The rotating packed bed according to claim 1 wherein the inner radius of the first packed bed and the inner radius of the second packed bed are the same.

6. The rotating packed bed according to claim 1 wherein the inner radius of the first packed bed and the inner radius of the second packed bed are different.

7. The rotating packed bed according to claim 1 wherein the outer radius of the first packed bed and the outer radius of the second packed bed are the same.

8. The rotating packed bed according to claim 1 wherein the outer radius of the first packed bed and the outer radius of the second packed bed are different.

9. The rotating packed bed according to claim 1 wherein the radial extent of the first and second packed bed are the same.

10. The rotating packed bed according to claim 1 the radial extent of the first packed bed differs from that of the second packed bed are different.

11. The rotating packed bed according to claim 1 wherein the RPB comprises further packed beds arranged on the rotatable shaft and arranged in series with the first and second packed beds.

12. The rotating packed bed according to claim 1 wherein the rotating shaft is arranged vertically or horizontally.

13. An absorption or desorption method using a rotating packed bed RPB, the method comprising: firstly directing a gas through a first rotating packed bed in co-current flow with a liquid in a radially outward direction from a rotating shaft; and secondly directing the gas through a second rotating packed bed in a radially inward direction in a counter-current flow with a liquid.

14. The method according to claim 13, further comprising directing a first liquid through the first rotating packed bed and directing a second liquid through the second rotating bed, where the first liquid is different from the second liquid.

15. The method according to claim 13 further comprising directing a first liquid through the first rotating packed bed and directing a second liquid through the second rotating bed, where the first liquid and the second liquid is a liquid emerging from the first packed bed and recirculated to the second packed bed.

16. The method according to claim 13 further comprising directing the gas through further packed beds arranged on same rotatable shaft alternating from a co-current flow with a liquid to a counter-current flow with a liquid.

* * * * *